Patented Oct. 30, 1951

2,573,038

UNITED STATES PATENT OFFICE 2,573,038

PAINT COMPOSITION AND METHOD OF PREPARING SAME

Ralph E. Madison, Detroit, Mich., assignor to Devoe & Raynolds Company, Inc., New York, N. Y., a corporation of New York No Drawing. Application August 3, 1948, Serial No. 42,339

6 Claims. (Cl. 260—736)

The present invention relates to a new and improved paint product containing chlorinated rubber. Paints of exceptionally good resistance to alkalies, salts and acids may be obtained with a chlorinated rubber base. One of the early uses of this material in paints occurred in acid plants where extensive use has proven its suitability for such service.

Chlorinated rubber compositions are particularly well suited for concrete floor paints because of their inertness to alkali and moisture. This resistance is very important in paints applied on concrete swimming pool surfaces particularly under water where the moisture present can dissolve alkali and saponify the oils in conventional paints.

One disadvantage to the use of chlorinated rubber in paint has been that such compositions can not be sprayed and are difficult to brush out. The basic discovery of my invention is a method of producing and controlling thixotropy in solutions of various linear polymers as described. This has been accomplished in the composition of my invention by the addition of factice. I have found that when factice and chlorinated rubber are combined in a coating composition in the proportions to be described below, the desirable properties of the chlorinated rubber are maintained but the brushability is improved and the resulting composition may be sprayed satisfactorily.

Another improvement that results from the addition of factice is that a considerably higher degree of dry-hiding is obtained over and above that encountered in conventional type paints.

Still another outstanding advantage of my particular composition is that a breathing type of paint is thereby produced which has special adaptation when used over masonry surfaces. In other words, I have a tough and durable film when properly pigmented and yet one which seemingly lets moisture in and out but still suffers none of the ill effects usually caused by passage of water through conventional paint films.

The factice I use in my composition is a solid, rubber-like sulfurized oil of the type extensively employed in the rubber industry as softening agents. White factice, which may range in color from water-white to yellow, commonly is prepared by the action of sulfur mono chloride on the desired oil. The reaction is exothermic in nature and must be controlled within fairly narrow temperature limits to prevent charring. In the preparation of white factice from 15 to 50 parts of sulfur mono chloride may be combined with 100 parts of the desired oil. Thus, a satisfactory product is obtained by the reaction of 30 parts of sulfur chloride with 100 parts of linseed oil.

Brown factice may be prepared by the action of sulfur on the desired oil, or mixture of oils. The reaction is somewhat slower than when sulfur chloride is employed and the mixture commonly must be heated before the desired reaction occurs. From 15 to 50 parts of sulfur may be combined with 100 parts of oil to prepare brown factice, the actual proportions employed in a given case depending largely upon the type of oil employed and the properties desired in the finished product. Brown factice may range in color from light brown to black. In general any of the unsaturated fatty oils may be vulcanized in the presence of sulfur to product a usable factice. Although brown and white factice are equally satisfactory from the standpoint of brushability and durability, I find it advisable to use a commercial grade known in the art as white factice for the production of light colored paints.

Factice is miscible in all proportions with chlorinated rubber and the amount used may be varied widely, the only restriction being that the final product should have a consistency in keeping with the various uses to which it is put. These conditions may be met while varying the factice to chlorinated rubber ratio between 4:1 and 1:4.

As the amount of factice is increased, the hardness of the dry paint film decreases, so that use of more factice than recommended above results in a weak protective coating that has poor adhesion and is easily scratched. On the other hand, if the amount of factice is reduced below 1:4, the desirable brushing and spraying properties are lost. The use of the optimum amount of factice is illustrated in the following examples.

Example I

| | Parts |
|---|---|
| Titanium dioxide—rutile | 4 |
| Titanium calcium pigment—rutile | 28 |
| Zinc oxide—acicular | 3.7 |
| Chlorinated rubber (40 centipoise) | 6.9 |
| Factice—soya | 6.9 |
| Solvent—(90% aromatic and 10% aliphatic hydrocarbons; kauri butanol of 80 or more) | 50.5 |
| | 100 |

The factice is milled on a 2-roll rubber mill for about 5 minutes after it has banded on the rolls, and then processed with the rest of the ingredients in a Baker Perkins machine. A second alternative is to add the rolled factice with the other ingredients to a steel ball mill and rotate for 16 hours. While the ball mill may be charged with raw factice without pre-rolling, the total time consumed by such a method is longer. The composition should be milled until the particle size of the factice and pigments have been reduced to from three to four on the Hegman gauge. The use of the Hegman fineness gauge is described on page 199 of the ninth edition of Physical and Chemical Examination of Paints, Varnishes, Lacquers and Colors by Henry A. Gardner.

The kauri butanol value referred to above is a common method of measuring the solvent power of petroleum thinners, being the number of milliliters of petroleum thinner required to cause cloudiness in 20 grams of a kauri-butanol solution. The standardized solution used in this test consists of 100 grams of kauri gum in 50 grams of butanol distilling between 114° and 116° C.

Actually most of the common organic solvents with the exception of alcohols and aliphatic hydrocarbons will dissolve chlorinated rubber and consequently may find use in my compositions. Illustrative of such solvents are the esters such as amyl acetate, methyl salicylate and butyl acetate; ethers such as Cellosolve; chlorinated solvents such as ethylene dichloride and chloroform; methyl ethyl ketone and methyl isobutyl ketone; dipentene; xylene, toluene and other aromatic solvents. The method of obtaining proper solvent balance by combination of solvents having different vapor pressures is well understood in the art and need not be described here.

Example II

| | Parts |
|---|---|
| Zinc oxide—acicular | 4.7 |
| Titanium dioxide—rutile | 9.4 |
| Titanium calcium pigment—rutile | 17.4 |
| Magnesium silicate | 4.1 |
| Chlorinated rubber (40 centipoise) | 5.18 |
| Factice—soya | 2.62 |
| Daub oil | 2.62 |
| Solvent—(90% aromatic and 10% aliphatic hydrocarbons; kauri butanol of 80 or more) | 53.98 |
| | 100 |

Daub oil is a term used by those in the leather industry to describe a linseed oil that has been carefully heat bodied to a semi-gel stage (see the Chemistry of Leather Manufacture, by J. A. Wilson, vol. 2, page 922 (2nd edition)). Up to one-half of the factice in my composition may be replaced by daub oil without altering the desirable brushing properties.

Example III

| | Parts |
|---|---|
| Zinc oxide—acicular | 4.7 |
| Titanium dioxide—rutile | 9.4 |
| Titanium calcium pigment—rutile | 17.4 |
| Magnesium silicate | 4.1 |
| Chlorinated rubber (40 centipoise) | 5.18 |
| Factice—soya | 10.48 |
| Daub oil | 10.48 |
| Solvent—(90% aromatic and 10% aliphatic hydrocarbons; kauri butanol of 80 or more) | 101.14 |
| | 163.08 |

The viscosity illustrated in Examples I through III is obtained by blending 65 parts of 20 centipoise chlorinated rubber with approximately 35 parts of 125 centipoise chlorinated rubber. It will be understood that although the viscosity of the chlorinated rubber is shown in the above examples to be 40 centipoise, this can be varied widely by the formulator depending upon the final consistency required of the composition. I find that the commercially available chlorinated rubber made by chlorination of natural or synthetic rubber and containing approximately 67% chlorine is satisfactory for my purpose.

It would appear that the unusual permeability of my new paint composition to moisture is due to the fact that the finely divided factice particles are not in true solution but are dispersed throughout the vehicle and entangled in the long chlorinated rubber molecules in such a way that a dense and tough film results.

In the appended claims the term "grinding" includes all types of operation in which the sulfurized oil is disintegrated to the desired particle size, and includes milling operations.

I claim:

1. A method of preparing a paint composition which comprises: milling factice on a roll mill; dispersing said factice in 0.25 to 4.0 parts of chlorinated rubber and an organic solvent having a kauri butanol value above 80; and grinding with pigments until the particle size has been reduced to approximately 3 on the Hegman gauge.

2. The method of preparing a paint composition which comprises dispersing a solid rubber-like sulfurized fatty oil in a chlorinated rubber solution by grinding the solid sulfurized fatty oil with a solution of a chlorinated rubber in a volatile solvent until the particle size of the dispersed sulfurized oil is about three to four on the Hegman gauge.

3. The process according to claim 2 in which paint pigments are also milled with a sulfurized fatty oil and chlorinated rubber solution to form a pigmented paint.

4. A chlorinated rubber paint composition consisting essentially of chlorinated rubber dissolved in a volatile solvent and having normally solid rubber-like sulfurized fatty oil of a particle size of about three to four on the Hegman gauge dispersed throughout the chlorinated rubber solution, the proportions of dispersed sulfurized oil and of chlorinated rubber being between 4:1 and 1:4.

5. A chlorinated rubber paint composition as defined in claim 4 which also contains paint pigments of particle size comparable with those of the chlorinated rubber.

6. A chlorinated rubber paint composition consisting essentially of chlorinated rubber dissolved in a volatile solvent and having normally solid rubber-like sulfurized fatty oil of a particle size of about three to four on the Hegman gauge dispersed throughout the chlorinated rubber solution in the proportions of about two parts of chlorinated rubber to one part of dispersed sulfurized fatty oil, and which also contains an amount of heat-bodied linseed oil approximately equal to the amount of sulfurized oil.

RALPH E. MADISON.

REFERENCES CITED

The following references are of record in the file of this patent:

UNITED STATES PATENTS

| Number | Name | Date |
|---|---|---|
| 1,544,530 | Ellis | June 30, 1925 |
| 1,703,920 | Bradley et al. | Mar. 5, 1929 |
| 1,773,101 | Geer | Aug. 19, 1930 |
| 2,068,818 | Root | Jan. 26, 1937 |

Certificate of Correction

Patent No. 2,573,038 October 30, 1951

RALPH E. MADISON

It is hereby certified that error appears in the printed specification of the above numbered patent requiring correction as follows:

Column 2, line 14, for "product" read *produce*; column 3, line 14, for "50" read *500*;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*